United States Patent
Fischer et al.

(10) Patent No.: US 6,607,305 B2
(45) Date of Patent: Aug. 19, 2003

(54) BI-DIRECTIONAL MICROMECHANICAL LATCHING LINEAR ACTUATOR

(75) Inventors: Kevin J. Fischer, Hillsboro, OR (US); Henry Guckel, deceased, late of Madison, WI (US), by Ausrele Mary Guckel, Special Administrator; Yogesh B. Gianchandani, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 98 days.

(21) Appl. No.: 09/873,935

(22) Filed: Jun. 4, 2001

(65) Prior Publication Data

US 2002/0181886 A1 Dec. 5, 2002

(51) Int. Cl.⁷ .................................................. G02B 6/38
(52) U.S. Cl. ......................................................... 385/57
(58) Field of Search .............................. 385/16, 15, 22, 385/52, 140, 20, 21, 23, 25, 53–57, 14, 95, 97, 98; 310/90.5, 40, 42–45; 250/227; 356/614

(56) References Cited

U.S. PATENT DOCUMENTS

| | | | |
|---|---|---|---|
| 4,438,987 A | * 3/1984 | Kapaan | ...................... 350/96.2 |
| 5,189,777 A | 3/1993 | Guckel et al. | |
| 5,190,637 A | 3/1993 | Guckel et al. | |
| 5,206,983 A | 5/1993 | Guckel et al. | |
| 5,327,033 A | 7/1994 | Guckel et al. | |
| 5,378,583 A | 1/1995 | Guckel et al. | |
| 5,470,043 A | 11/1995 | Marts et al. | |
| 5,644,177 A | 7/1997 | Guckel et al. | |
| 5,808,384 A | 9/1998 | Tabat et al. | |
| 6,087,743 A | 7/2000 | Guckel et al. | |
| 6,124,650 A | 9/2000 | Bishop et al. | |
| 6,102,582 A1 | * 8/2002 | Espindola et al. | ............ 385/57 |
| 6,496,612 B1 | 12/2002 | Ruan et al. | |

FOREIGN PATENT DOCUMENTS

| | | | | |
|---|---|---|---|---|
| EP | 0 258 569 | * | 3/1988 | .................. 385/57 |
| JP | 61-228407 | * | 10/1986 | .................. 385/57 |

OTHER PUBLICATIONS

H. Guckel, et al., "Electromagnetic, Spring Constrained Linear Actuator with Large Throw," Actuator 94, 15–17 Jun. 1994, Bremen, Germany, pp. 1–4.

T.R. Ohnstein, et al., "Tunable IR Filters Using Flexible Metallic Microstructures," Proceedings of IEEE Micro Electro Mechanical Systems (MEMS) 1995, Amsterdam, Holland, Jan. 29–Feb. 2, 1995, pp. 170–174.

B. Rogge, et al., "Magnetic Miroactuators Fabricated by the LIGA—Technique for Large Displacements or Large Forces," Actuator 96, 5th International Conference on New Actuators, 26–28 Jun. 1996, Bremen, Germany, pp. 112–115.

(List continued on next page.)

Primary Examiner—Jean F. Duverne
(74) Attorney, Agent, or Firm—Foley & Lardner

(57) ABSTRACT

A micromechanical actuator includes a plunger, having two magnet heads spaced from each other and joined to move together, that is supported for linear movement on a substrate. A magnetic core is supported on the substrate and has gaps in the core adjacent to the heads of the plunger. At least one permanent magnet is mounted to the plunger to move with it and forms, with the core, first and second magnetic circuits for flux which pass through the first and second heads of the plunger. A coil is coupled to the magnetic core to provide flux to the core. When the coil is supplied with DC current in one direction, the flux from the coil opposes the flux from the permanent magnet in one of the gaps and augments the flux in the other gap, causing the plunger to move in the direction of the gap having the augmented flux. After the plunger has switched positions, the electrical current in the coil is turned off, leaving the plunger latched in its switched position due to the flux from the permanent magnet. Switching to the opposite position of the plunger is carried out by supplying current to the coil in the reverse direction, drawing the plunger to its opposite position.

28 Claims, 12 Drawing Sheets

OTHER PUBLICATIONS

H. Guckel, "Progress in Electromagnetic Microactuators," Actuator 96, 5th International Conference on New Actuators, 26–28 Jun. 1996, Bremen, Germany, pp. 45–48.

H. Guckel, et al., "Electromagnetic Linear Actuators With Inductive Position Sensing," Sensors and Actuators A 53, 1996, pp. 386–391.

T. Earles, et al., "Magnetic Microactuators for Relay Applications." Actuator 96, 5th International Conference on New Actuators, 26–28 Jun. 1996, Bremen, Germany, pp. 132–135.

* cited by examiner

BI-DIRECTIONAL MICROMECHANICAL LATCHING LINEAR ACTUATOR

FIELD OF THE INVENTION

This invention pertains generally to the field of micromechanical devices and processing techniques, and particularly to micromechanical actuators and actuators for fiber optic switches.

BACKGROUND OF THE INVENTION

Linear microactuators and micromotors are utilized in a variety of applications in micro-electromechanical systems (MEMS), including incorporation in electrical switches, relays, valves and rotational drives. A significant application of linear microactuators is in switches that are utilized to send a signal on an incoming optical fiber to one of two output fibers (i.e., a 1×2 switch). Such devices may be utilized as network elements in optical communication systems, subscriber loop networks, fiber to the home applications, optical cross-connects for redundant or protective switching, and for factory testing of optical elements and equipment. See, generally, H. Jones-Bey, "Optical Switches Pursue Cross-Connect Markets," Laser Focus World, May, 1998, pp. 153–162.

There are two general approaches to accomplish optical switching with the use of passive optical techniques (that is, without using optical amplifiers). One approach is to move the incoming fiber itself into alignment with one or the other of the two outgoing optical fibers (moving fiber switch). The other approach fixes both the input and output fibers in place and moves something else that routes the light to one of the two outgoing fibers (fixed fiber switch). Of the two approaches, the moving fiber switch has the potential to obtain a lower insertion loss because the fixed fiber switches require additional elements within the switch, such as a mirror or waveguide, which result in additional optical losses. Switch losses originate from factors such as fiber misalignment and the Fresnel reflection loss at the glass-air interface. As a consequence, the moving fiber type of switch is particularly attractive for use in low loss applications. For all of these applications, it is generally preferable to switch a single mode optical fiber because it has less optical power lost per unit length as compared to a multimode fiber. The task of switching a single mode optical fiber is challenging because the core of a single mode fiber is small (e.g., about 9 $\mu$m in diameter), and this small size makes precise alignment of the fibers within the switch extremely critical. Low loss switching (less than 1 dB optical power loss) requires alignment tolerance on the order of tenths of microns or less. The ability to properly align the fibers is thus the most critical issue affecting optical switching performance.

Moving fiber switches have been fabricated using several techniques. Because the throw requirement is somewhat greater than the diameter of one fiber (about 125 $\mu$m), the switches that have been implemented have typically used thermal and magnetic actuators. Surface micromachining techniques have been used to fabricate an optical fiber switch with latching obtained by using two actuators. M. Hoffmann, et al., "Optical Fiber Switches Based on Full Wafer Silicon Micromachining," J. Micromechanics & Microengineering, Vol. 9, 1999, pp. 151–155. The power dissipated in thermal actuators is relatively large (on the order of several hundred milliwatts). This power dissipation can be troublesome when a large number of switches are employed. In contrast, magnetic switches have been used to produce excellent low power switches. N. Tabat, et al., "Single Flux-Path Bi-Directional Linear Actuators," HARMST '97, Madison, Wis., June, 1997; and Tabat, et al., U.S. Pat. No. 5,808,384. Such devices have been produced utilizing the LIGA microfabrication process, which produces parts which have not only high precision tolerances but extremely low run-out as well. As a consequence, parts made using the LIGA technology have virtually perfect vertical sidewalls. Typical run-out for LIGA parts is less than 0.1 $\mu$m per 100 $\mu$m of height, which is advantageous for fabricating alignment fixtures for the optical fiber switch. LIGA can be used to make both durable metal parts as well as soft magnetic materials. See, e.g., T. R. Christenson, et al., "Application of Deep X-Ray Lithography Fabricated Rare Earth Permanent Magnets to Multi-Pole Magnetic Microactuators," Transducers '99, June, 1999. Additional microactuators fabricated utilizing the LIGA process are described in T. Earles, et al., "Magnetic Microactuators for Relay Applications," Proc. of Actuator 96, Jun. 26–28, 1996, Bremen, Germany, pp. 132–135, and U.S. Pat. No. 5,664,177, entitled Micromechanical Magnetically Actuated Devices.

The optical performance of the moving fiber type switches depends almost entirely on the quality of the fiber alignment. This alignment is done typically through the use of some type of V-groove technique. The precision of the V-groove therefore determines the quality of the switch. Earlier versions of LIGA process fabricated optical fiber switches yielded excellent optical performance (0.5 dB insertion loss in air) because the technology produces excellent alignment flats for the fiber. See, H. Guckel, et al., "Single Mode Optical Fiber Switch," HARMST '99, Tokyo, Japan, June, 1999. This performance level was achieved even without the use of matching fluids. Generally, avoiding the use of matching fluid is attractive to avoid packaging problems and reliability issues. However, when matching fluid was used, the insertion loss for such devices was reduced to the order of 0.1–0.2 dB. A limitation of prior versions of LIGA optical switches was the requirement for the continuous application of power to hold the moving fiber in either of its two end positions. Where the switch is to be used in applications in which switching will take place relatively infrequently, it would generally be desirable to have a switch which is latched in its two end positions and requires power only during switching to reduce overall power consumption and device heating.

SUMMARY OF THE INVENTION

A bi-directional micromechanical latching linear actuator in accordance with the invention provides high precision linear actuation for applications such as electrical and optical switches, relays, valves, and other devices requiring high precision actuation. Using micromachining techniques, the actuator may be embodied in a physical structure having dimensions of a few millimeters on a side or less. The actuator action provides relatively high force while providing relatively low electrical impedance, allowing low drive voltages to be utilized. Electrical power is required only during switching of the actuator from one of its end positions to the other, with the actuator remaining latched in its end position after switching has been completed with no further drive power required. Consequently, the total power consumption for operation of the device is very low, and during periods of time when no switching occurs, no power is consumed.

The bi-directional micromechanical latching actuator of the invention includes a non-magnetic substrate having a surface, a plunger having two magnetic heads spaced from each other and joined to move together, with at least the heads of the plunger formed of a magnetic material, and a magnetic core supported on the substrate having first end faces spaced apart to define a first gap in the core adjacent to a first of the heads of the plunger and second end faces spaced apart to define a second gap in the core adjacent to a second of the heads of the plunger. Means are provided for supporting the plunger for linear movement in two directions such that the heads of the plunger can move toward and away from the first and second gaps in the core. Motion in one direction brings the first of the heads closer to the first of the gaps in the core and the second of the heads further from the second of the gaps in the core. Motion in the other direction brings the second head closer to the second gap in the core and the first head further away from the first gap in the core. At least one permanent magnet is mounted to the plunger to move therewith and forms with the core a first magnetic circuit in which flux from the permanent magnet passes through the magnetic core across the first of the gaps through the first head of the plunger and then back through the magnetic core to the permanent magnet. A second magnetic circuit is formed in which the flux from the permanent magnet passes through the magnetic core across the second of the gaps in the core through the second of the heads and thence back through the magnetic core to the permanent magnet. At least one coil of electrical conductor is coupled to the magnetic core to provide magnet flux therethrough to the first and second magnetic circuits. When the coil is supplied with electrical current in a first direction, the coil provides flux in a direction through the first magnetic circuit which augments the flux from the permanent magnet such that the first head of the plunger is magnetically drawn toward the first gap by reluctance action and provides flux to the second magnetic circuit in a direction to oppose the flux from the permanent magnet. When the direction of current through the coil is reversed, the coil provides flux to the first magnetic circuit to oppose the flux from the permanent magnet and provides flux to the second magnetic circuit which augments the flux from the permanent magnet such that the second head of the plunger is magnetically drawn toward the second gap by reluctance action. The current through the coil is preferably selected to substantially null the flux in one of the gaps, with the increased flux through the other gap providing a strong magnetic force on the adjacent head of the plunger to rapidly switch the plunger.

For high precision switching operations, the actuator may be provided with stop structures positioned to engage a portion of the plunger at a selected limit of travel of the plunger in each direction of linear movement of the plunger. In this manner, the plunger is held at one or the other of its limits of travel by reluctance action from the flux from the permanent magnet when no current is supplied to the first and second coils with the position of the plunger being precisely fixed.

A means for supporting the plunger may comprise a spring mounted to the substrate to suspend the plunger for linear movement above the substrate surface. The spring provides a relatively frictionless support for the plunger and provides a spring bias of the plunger back to a neutral position in which each of the heads of the plunger are withdrawn an equal distance from the adjacent gaps. This spring bias provided by the spring further augments the force applied to the plunger to switch it from one of its positions to the other when the coil is supplied with power.

The actuator of the invention is particularly adapted to utilization with an optical switch coupled to the plunger to shift the direction of transmission of light through the switch when the plunger is moved from one of its limits of travel to the other. Such an optical switch may comprise an optical fiber connected to the plunger to be moved by it and two fixed optical fibers, the moving and fixed optical fibers having end faces such that the end face of the moving fiber is aligned with the end face of one or the other fixed fiber at each of the limits of travel.

Further objects, features and advantages of the invention will be apparent from the following detailed description when taken in conjunction with the accompanying drawings.

DETAILED DESCRIPTION OF THE INVENTION

Figure 1:
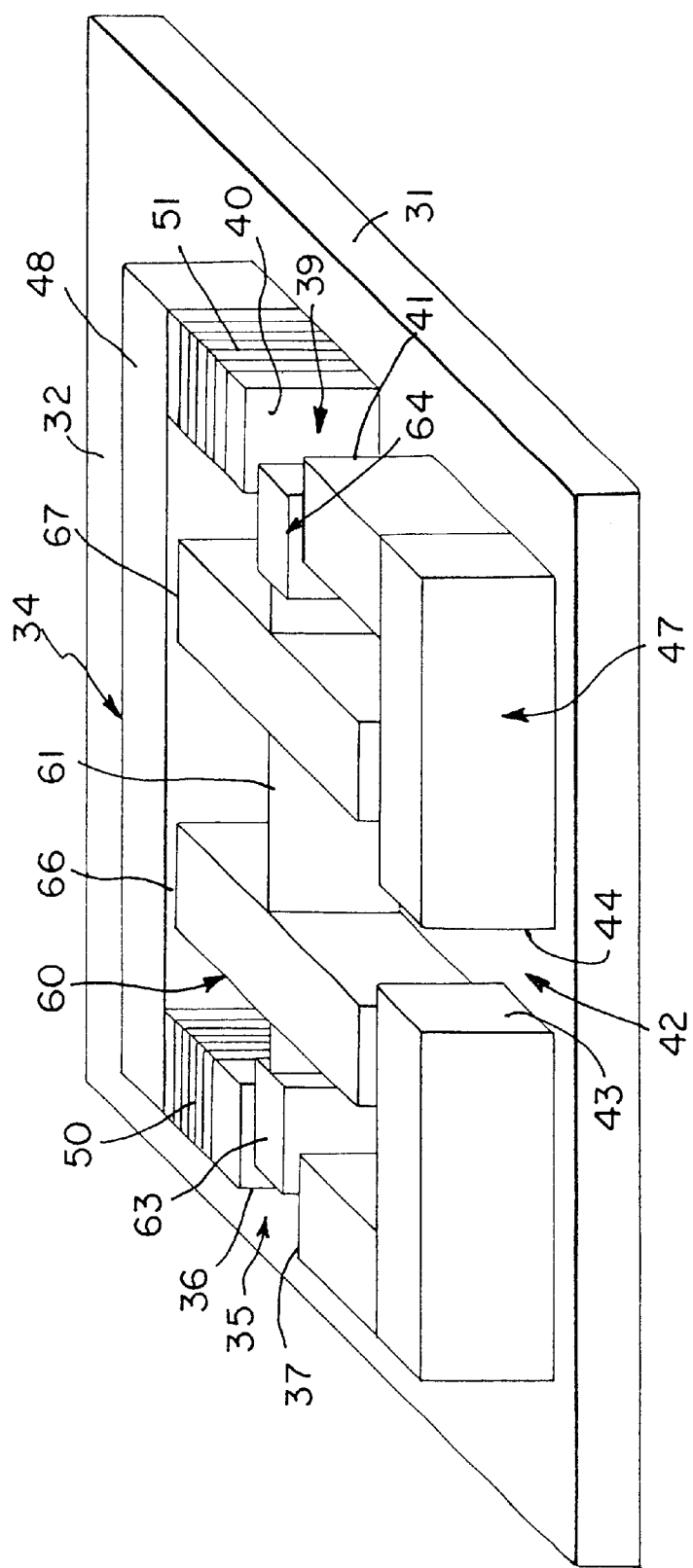
FIG. 1 is a simplified perspective view of a bi-directional linear actuator in accordance with the invention.
Figure 2:
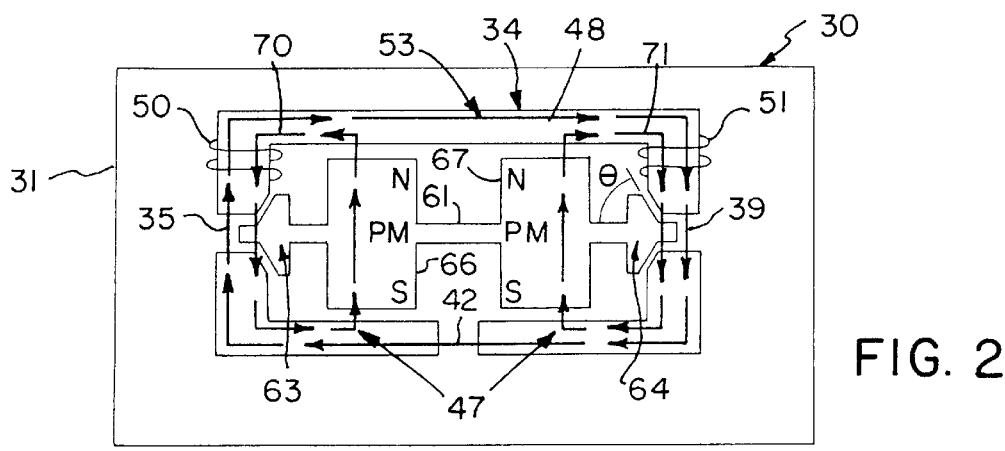
FIG. 2 is a schematic view of the actuator of FIG. 1 showing the magnetic flux paths through the magnetic material of the actuator.

With reference to the drawings, a simplified view of a bi-directional micromechanical latching linear actuator illustrating the principles of the invention is shown generally at 30 in FIG. 1. The actuator 30 is formed on a substrate 31 in a manner suited for the formation of micro-devices, although it is understood that the substrate can constitute any type of support for micromechanical elements. The substrate 31 has a top surface 32 on which is mounted a magnetic core 34 which functions as the stator for the linear actuator. The magnetic core 34 functions to guide the magnetic flux and is preferably formed of a high permeability material for this purpose. A first gap 35 in the magnetic core is defined by end faces 36 and 37 and a second gap 39 is defined by end faces 40 and 41. A control gap 42, defined by spaced apart end faces 43 and 44, separates the lower portion 47 of the core into two sections, while the upper portion 48 of the core may be formed of one continuous piece as shown. An electromagnetic coil is coupled to the upper section of the core 48, and may comprise two separated coil sections 50 and 51 which generally may be electrically connected in series, and which are both coupled to the core section 48 to provide flux thereto which extends in the same direction and thus is additive. As illustrated in FIG. 2, the flux from the coils 50 and 51 travels on a flux path 53 on a circuit through the upper section 48 of the core, across the second gap 39 to the lower section 47 of the core and across the gap 42 in the lower section 47, and thence across the first gap 35 back to the upper section 48 of the core to complete a magnetic circuit through the core sections.

The actuator 30 further includes a plunger 60 which has an elongated plunger body 61 at the ends of which are mounted a first plunger head 63 and a second plunger head 64. The end faces 36 and 37 of the first gap 35 in the core are adjacent to the first head 63 of the plunger, and the end faces 40 and 41 of the second gap 39 are adjacent to the second head 64 of the plunger. At least the heads 63 and 64 are formed of a material which has high permeability, generally referred to herein as a magnetic material. A first permanent magnet 66 and a second permanent magnet 67 are mounted to the plunger body 61 to move therewith. Not shown in FIG. 1 is a means for supporting the plunger for linear movement in two directions such that the heads 63 and 64 of the plunger can move toward and away from the first and second gaps 65 and 69 in the core. Linear motion of the plunger in one direction brings the first head 63 closer to the first gap 65 and the second head 64 further from the second gap 39, whereas movement in the other direction brings the second head 64 closer to the second gap 39 and the first head 63 further away from the first gap in the core. A means for supporting the plunger can comprise any type of bearing or support which allows for constrained linear motion of the plunger, including slide bearings, a channel in which the plunger slides, support springs, etc.

As illustrated in the simplified diagram of FIG. 2, a first magnetic circuit 70 is formed which guides the flux from the first permanent magnet 66 on a path from the magnet 66 through a section of the upper portion 48 of the magnetic core across the first gap 35 to a section of the lower portion 47 of the magnetic core and thence back to the first permanent magnet 66. Similarly, a second magnetic circuit 71 is formed to guide the flux from the second permanent magnet 67 through a section of the upper core portion 48 across the second gap 39 to a section of the lower core portion 47 and thence back to the second permanent magnet 67. When current is supplied to the coils 50 and 51 (which are preferably connected together in series) in a first direction to provide flux which extends along the flux path 53 in the direction of the arrows on the flux path 53 shown in FIG. 2, the flux from the coils augments the flux from the second permanent magnet 67 in the second magnetic circuit 71 in the second gap 39 and opposes the flux from the first permanent magnet 66 in the first magnetic circuit 70 in the firs gap 35. When current is supplied to the coils 50 and 51 in the opposite direction, i.e., the DC current flow is reversed, the direction of the flux on the main core flux path 53 is in the opposite direction of the arrows shown in FIG. 2, augmenting the flux in the first magnetic circuit 70 and opposing the flux in the second magnetic circuit 71 in the second gap 39. The coil is shown as two separated coils 50 and 51 in FIG. 2, but it is understood that a single coil (or more multiple coil sections) could be utilized which is coupled to the core portion 48, and hereafter the use of the term coil will be understood to include either a single coil or multiple coils, and vice versa.

When no current is supplied to the coils 50 and 51, forces will be exerted on the heads 63 and 64 of the plunger by reluctance action, and the head 63 or 64 which is closest to the end faces of the respective gaps 35 and 39 will exert a greater force on the plunger than the other head, drawing the plunger to an end position. For example, the first head 63 may be drawn to its end position in which it is in closest proximity (or in contact with) the end faces forming the gap 35. When the coils 50 and 51 are supplied with current, the flux from the coils opposes the flux in the gap 35 and, if the current level is appropriately selected, the flux from the coils 50 and 51 will effectively cancel the flux in the gap 35 from the permanent magnet 66, reducing the reluctance force in the first head 63 to near zero. Conversely, the flux from the coils 50 and 51 will augment the flux in the gap 39 from the second permanent magnet 67, providing a strong force on the second head 64 to draw the head 64, and the remainder of the plunger with it, toward the second gap 39 until the plunger reaches its second end position in which the second head 64 is proximate to or in contact with the end faces of the second gap 39. The current being supplied to the coils 50 and 51 may now be turned off, and the plunger will remain latched in its second position in which the second head 64 is close to the second gap 39 and the first head 63 is at its farthest position away from the first gap 35. When the actuator is to be switched to its other position, the direction of current supplied to the coils 50 and 51 is reversed such that the flux on the main core flux path 53 opposes the flux from the second permanent magnet 67 in the second gap 39, preferably substantially canceling it, and the flux from the coils 50 and 51 in the first gap 35 augments the flux from the first permanent magnet 66, resulting in a strong reluctance force being applied to the first head 63 to draw it and the remainder of the plunger toward the first gap 35 until the plunger reaches it end position. Although a spring support is not required to spring bias the plunger toward its central or neutral position (which is generally the position illustrated in FIG. 2), it is useful to have a spring bias for the plunger which returns it to the neutral position because such spring bias augments the release of the plunger away from its latched end positions.

The gap 42 in the lower portion 47 of the magnetic core provides a high reluctance path which helps to separate the first magnetic circuit 70 from the second magnetic circuit 71, so that most of the flux from the permanent magnets 66 and 67 is confined to the low reluctance magnetic circuits 70 and 71. However, the flux from the activated coils 50 and 51 will primarily pass on the magnetic flux circuit 53 through the magnetic core portions 47 and 48 across the reluctance of the gap 42 without substantially passing through the permanent magnet 66 and 67, thereby avoiding demagnetizing the permanent magnets.

Figure 3:
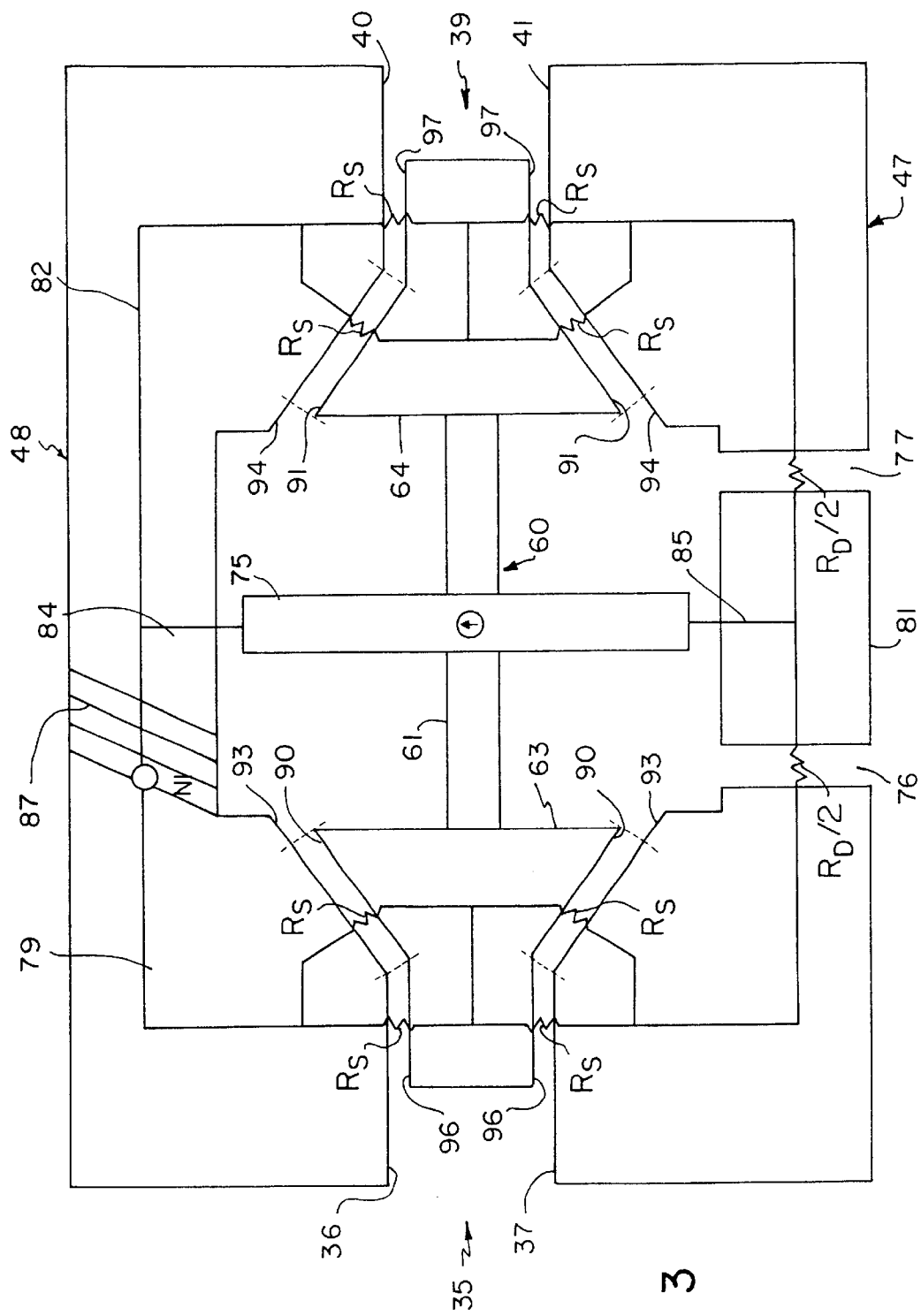
FIG. 3 is a plan view of another actuator in accordance with the invention utilizing a single permanent magnet.

The bi-directional linear actuator of the present invention may also be embodied utilizing a single permanent magnet on the plunger rather than two. As illustrated in FIG. 3, a single permanent magnet 75 may be centrally mounted to the plunger body 61, with two gaps 76 and 77 being formed in the lower portion 47 of the magnetic core. A first magnetic circuit 79 directs flux from the permanent magnet 75 through the upper core portion 48 across the first gap 35 and through the first head 63 to the lower portion 47 of the core, thence across the gap 76 to a central section 81 of the lower portion 47 (separated from the remainder of the core portion 47 by the gap 76 and 77) and thence back to the permanent magnet 75. A second magnetic circuit 82 directs flux from the permanent magnet 75 through the upper core portion 48 across the second gap 39 through the second head 64 to the lower portion 47 of the core, thence across the gap 77 to the central section 81 and thence back to the permanent magnet 75. The magnetic circuits 79 and 82 are coincident along flux paths 84 from the permanent magnet to the upper portion 48 and along a flux path 85 from the central section 81 of the lower portion 47 back to the permanent magnet. An electrical coil 87 is coupled to the upper portion 48 of the magnetic core to provide flux thereto on a flux path through the core portions 47 and 48 and across the gaps 35, 39, 76 and 77. When current is supplied to the coil 87 in a first direction of current flow, the flux from the coil 87 will tend to augment the flux on the second flux path 82 in the gap 39 and cancel the flux in the first magnetic circuit 79 in the gap 35, and when the current flow in the coil is reversed, the flux from the coil will augment the flux from the first magnetic circuit 79 in the first gap 35 and oppose the flux from the permanent magnet in the second magnetic circuit in the second gap 39, thus providing actuation of the plunger in one direction or the other in the same manner as discussed above for the actuator of FIGS. 1 and 2 having two permanent magnets. A larger single magnet 75 may be utilized which provides comparable flux density to the two magnets 66 and 67. The gaps 76 and 77, with their associated reluctances, now appear in the first and second magnetic circuits 79 and 82. To obtain the appropriate flux from the permanent magnet 75 through the first and second gaps 35 and 39, the width of the gaps 76 and 77 can be reduced from the width of the gap 42 until the reluctance of the gaps 76 and 77 is sufficiently small. In appropriate cases, the gaps 76 and 77 may be eliminated altogether.

As is illustrated in FIG. 3, the flux in the first and second gaps 35 and 39 passes through the high permeability heads 63 and 64 of the plunger. The heads 63 and 64 may be shaped as shown to have faces 90 and 91 for the heads 63 and 64, respectively, that are oblique to the direction of travel of the plunger, and that parallel similarly oblique end faces 93 and 94 of the magnetic core for the heads 63 and 64, respectively. The heads 63 and 64 may also have faces 96 and 97, respectively, which are parallel to the direction of travel of the plunger and which are parallel to adjacent core end faces 36 and 37 for the head 63 and 40 and 41 for the head 64. The provision of the oblique faces 90 and 91 on the heads 63 and 64, with the facing oblique surfaces 93 and 94 on the core, allows the spacing between these facing surfaces to decrease as a head moves into the gap, thereby further decreasing the reluctance of the air space between the core faces and the head. If the gaps 76 and 77 are eliminated, the total reluctance of the magnetic circuit for the flux from the coil 87 is now determined primarily by the reluctance of the spacing between the core faces and the adjacent faces of the head. As the plunger moves in one direction or the other, the spacing between one of the heads and the adjacent core faces will decrease while the spacing between the other head and the adjacent core faces will increase, so that the total reluctance for the flux from the coil 87 around the entire circuit through the core sections remains relatively constant.

A preferred micromachining process for producing the micromechanical elements of the actuator of the invention is a sacrificial deep X-ray lithography and electroplating process based on the LIGA process. This process allows the fabrication of fixed parts, which are attached to a substrate, and free parts which are released from a substrate and subsequently assembled onto the fixed parts. This process can be utilized to make high precision parts out of a variety of materials. These materials are normally, but not necessarily limited to, metals that can be electroplated, the most common of which are nickel, nickel/iron (e.g., 78%/22% permalloy) and copper. Permalloy is a desirable material for use in micromechanical devices such as the actuator of the invention because it is a good magnetic material, having a high permeability, and good mechanical properties. These properties include a Young's Modulus of $1.4 \times 10^{11}$ Pa, a hardness on the Vickers scale of 520, a yield strength of about 200 ksi, a density of 9.0 g/cm$^3$, and a relative permeability of 2,000. A modification of the LIGA process may be utilized to form permanent magnets. See, T. R. Christenson, et al., "Deep X-Ray Lithography Based Fabrication of Rare-Earth Based Permanent Magnets and Their Applications to Microactuators," Transducers and Actuators '99, June, 1999. Micromachined permanent magnets may also be produced by micro-electro-discharge machining (micro-EDM) processes including processes using LIGA fabricated electrodes. See, K. Takahata, et al., "A Novel Micro Electro-Discharge Machining Method Using Electrodes Fabricated by the LIGA Process," Tech. Dig., IEEE Intl. Conf. on Micro Electro Mechanical Systems (MEMS '99), Orlando, Fla., January, 1999, pp. 238–243; K. Takahata, et al., "High-Aspect-Ratio WC-Co Microstructure Produced by the Combination of LIGA and Micro-EDM," Microsystem Technologies, Vol. 6, No. 5, August, 2000, pp. 175–178. Generally, it is desirable when forming parts utilizing the LIGA process to lap and polish the metal parts to a specified height, which produces planarized pieces. These pieces can be assembled because they are flat (with parallel surfaces) and of a repeatable and known height.

Figure 4:
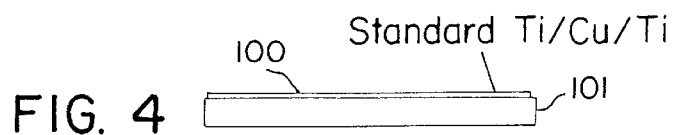
FIG. 4 is an illustrative view showing a substrate with a plating base thereon which can be utilized for forming the mechanical parts for the actuator of the invention.
Figure 5:
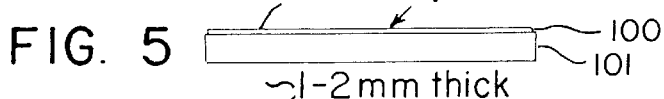
FIG. 5 is a view of the substrate of FIG. 4 at a further processing step.
Figure 6:
FIG. 6 is a view of the substrate of FIG. 5 with a sheet of photoresist positioned adjacent thereon.
Figure 7:
FIG. 7 is a view as in FIG. 6 showing the results of milling of the surface of the photoresist sheet.
Figure 8:
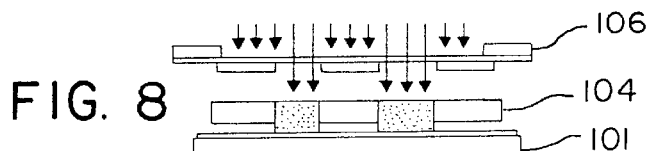
FIG. 8 is a view as in FIG. 7 illustrating the exposure of the photoresist to X-rays through an X-ray mask.
Figure 9:
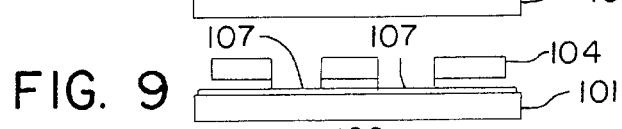
FIG. 9 is a view of the substrate and photoresist after X-ray exposure and development of the photoresist.
Figure 10:
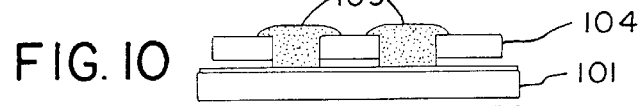
FIG. 10 is a view of the photoresist and substrate of FIG. 9 after electroplating of metal in the open areas of the photoresist.
Figure 11:
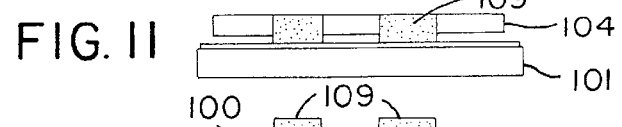
FIG. 11 is a view as in FIG. 10 after lapping and polishing of the electroplated material.
Figure 12:
FIG. 12 is a view of the substrate and electroplated material of FIG. 11 after removal of the photoresist.

The sequence of steps for the LIGA type fabrication process that may be utilized to produce the actuators of the present invention are illustrated in FIGS. 4–12. As illustrated in FIG. 4, an initial step involves the deposit of a plating base 100 on a substrate 101. Various substrates may be utilized. The substrate generally is non-magnetic so as not to affect the flux paths. A common and readily obtained material is crystalline silicon having an oxidized surface. Some applications require an insulating substrate. Suitable insulating substrates include ceramics such as Al$_2$O$_3$ or glass, with an Al$_2$O$_3$ ceramic being preferred for robustness. After surface treatment of the substrate, the seed layer or plating base 100 is applied by sputtering. A typical plating base is a Ti/Cu/Ti sandwich. The bottom Ti layer provides adhesion of the parts to the substrate and all electroplating actually takes place on the Cu layer. The top layer of Ti is a protective layer that may be utilized when using a developer that will etch copper. Immediately following sputtering, an adhesion promoter 102 is spun on to the plating base on the substrate as illustrated in FIG. 6. A positive optical photoresist monolayer (PPAP or positive photoresist adhesion promoter) is used for this purpose. After a heat cycle, 9% polymethylmethacrylate (PMMA) dissolved in chlorobenzine is spun onto the substrate to an approximate thickness of 1.6 $\mu$m. The substrate is then baked to remove the solvent from the PMMA. PMMA is commercially available in large sheets of various thicknesses. This material may be purchased at a thickness of 1.6 mm and cut into pieces of the required size (based on mask size). The PMMA sheet 104 is then solvent bonded to the spun-on coat of PMMA using the monomer methylmethacrylate (MMA) as shown in FIG. 6. This process is described in U.S. Pat. No. 5,378,583, incorporated by reference. Weights are applied during the drying process. Once the solvents have diffused out, the sheet 104 may be milled down to a desired height, as illustrated in FIG. 7, and then exposed using an X-ray mask 106 using X-rays from a collimated source, as illustrated in FIG. 8. Such collimated sources include synchrotron radiation sources (e.g., University of Wisconsin Aladdin Synchrotron, SRC, Stoughton, Wis.). After exposure to 3 KeV electrophotons, the sample is developed using a standard PMMA developer to leave the photoresist sheet with openings 107 therein which expose the plating base as shown in FIG. 9. Electroplating preparation consists of removing the top Ti layer of the plating base 100 to expose the copper layer. A dry fluorine based plasma reactive ion etching (RIE) etch may be utilized for surface. However, certain geometries of high aspect ratio trenches require a wet HF based etch. After the Ti layer is removed, the Cu surface is wetted and cleaned before plating. As illustrated in FIG. 10, the electroplated metal 109 is overplated into the openings 107, and then lapped back to the surface of the PMMA sheet 104 using fixed diamond polishing as illustrated in FIG. 11. A final step for fixed parts is to dissolve the PMMA mold 104 to leave the parts 109 fixed to the plating base 100 and the substrate 101 as illustrated in FIG. 12. The PMMA may be dissolved utilizing dichloromethane. If the formed parts 109 are intended to be freed, the Cu layer of the plating base under them can be etched to release the parts, for example, by using an ammonium hydroxide based copper nitrate solution.

Figure 13:
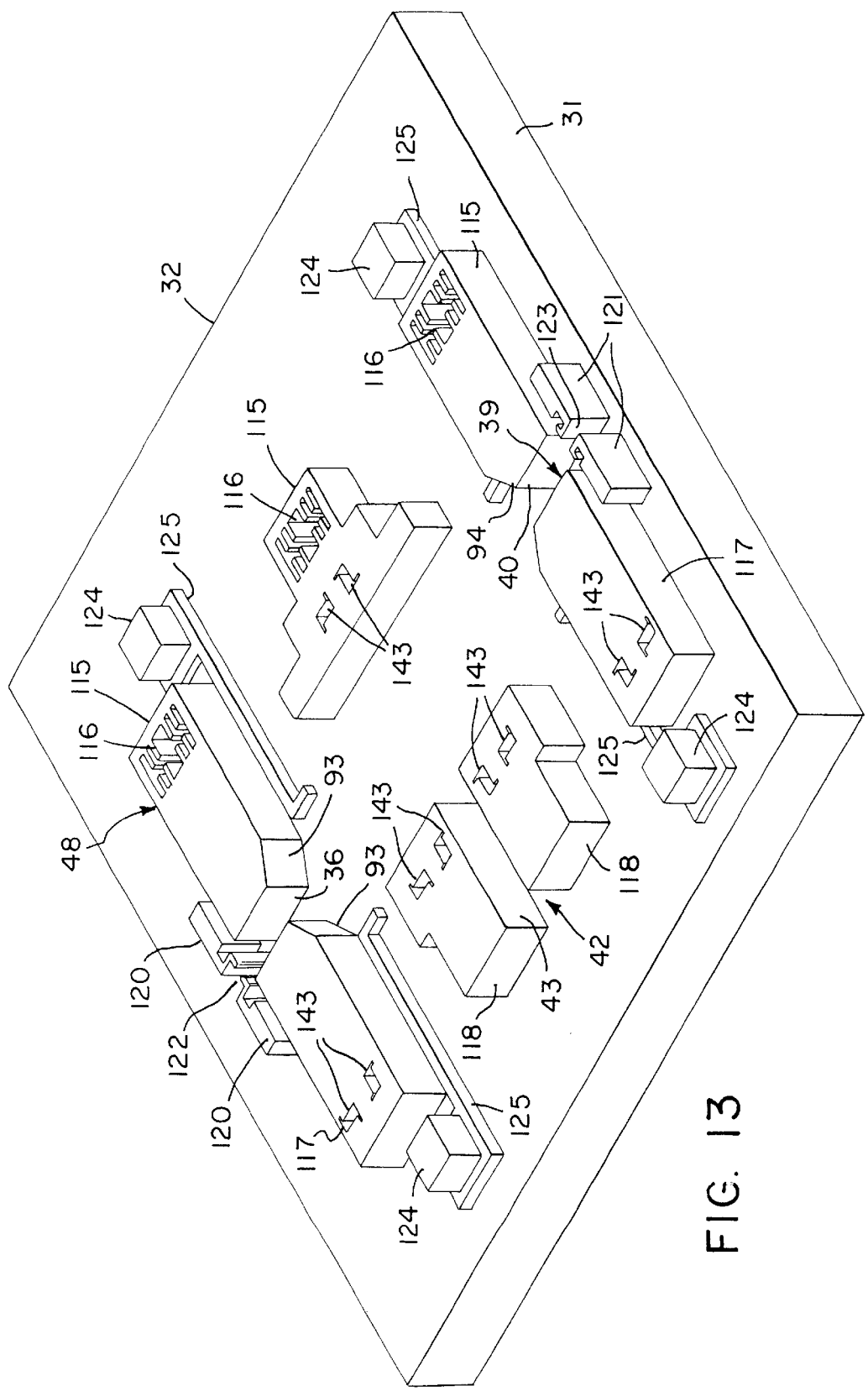
FIG. 13 is a perspective view of the parts of an exemplary micromechanical actuator that are fixed to a substrate.

The formation and assembly of an exemplary bi-directional micromechanical latching linear actuator in accordance with the invention formed by the LIGA process as discussed above is shown in FIGS. 13–20. FIG. 13 shows the stationary parts of the actuator which are bonded to the substrate 31. These include sections 115 of the upper core portion 48 which have receptacle openings 116 formed therein to receive other parts of the core that will be assembled thereto, as discussed further below. The lower portion of the core 47 also is formed in separate parts 117 on the ends and 118 in the middle, with the parts 118 being spaced apart to define the gap 42. Stop structures 120 are formed adjacent to the first gap 35 to provide a mechanical stop to limit the end motion of the plunger in one direction of motion and stop structures 121 are formed adjacent to the second gap 32 to limit the motion of the plunger in the opposite direction. The stop structures 120 and 121 are spaced apart to define gaps 122 and 123, respectively, to allow mechanical connections therethrough to the plunger to allow the plunger to activate other devices, as discussed further below. Mounting posts 124 are formed on the substrate for mounting a spring supported plunger, and shims 125 are assembled onto the posts 124 and serve to support the spring and plunger assembly (discussed further below) above the surface 32 of the substrate so that the plunger can move freely without frictional contact with the substrate.

Figure 14:
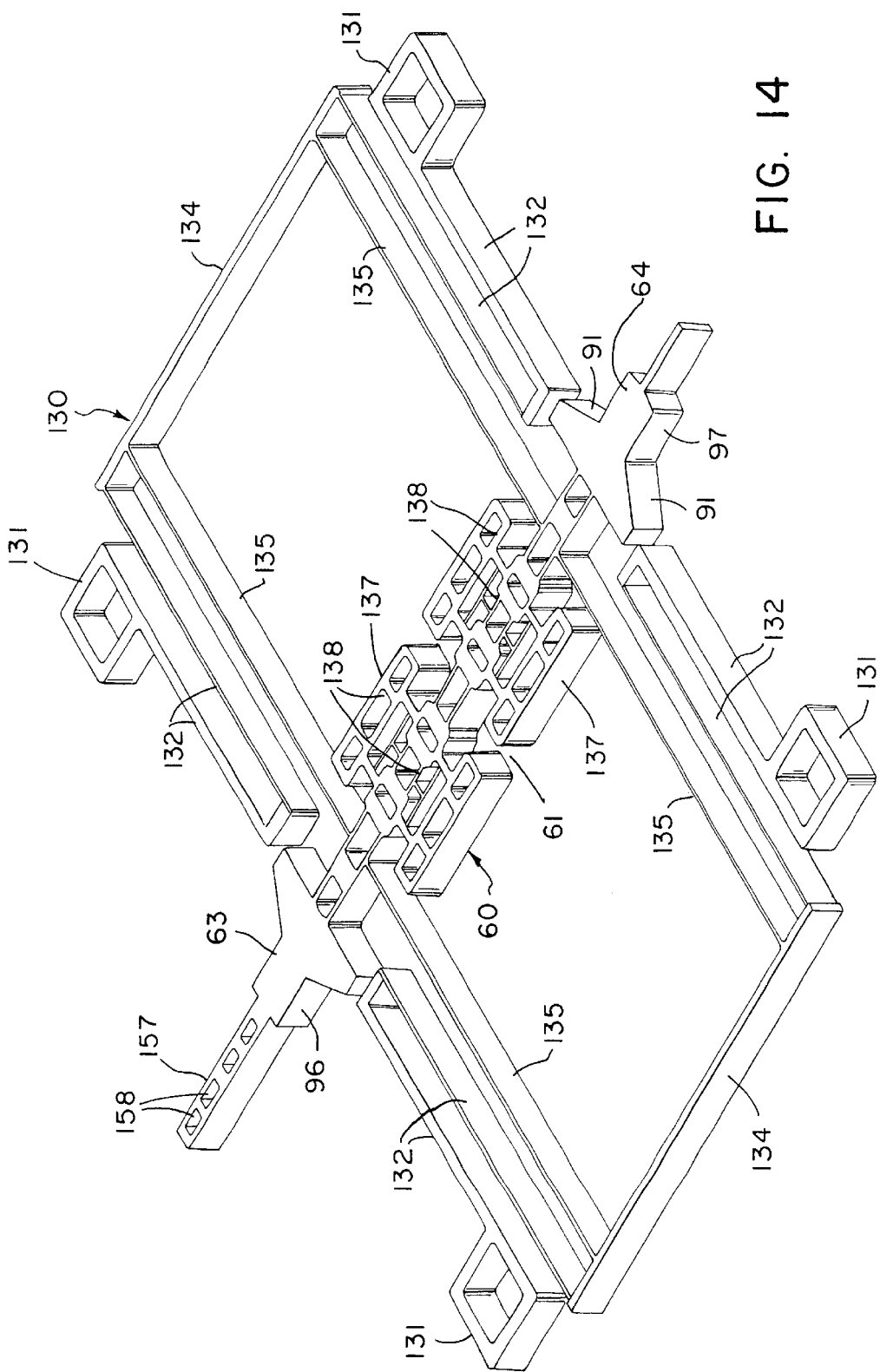
FIG. 14 is a perspective view of a plunger and spring support assembly for the micromechanical actuator in accordance with the invention.
Figure 15:
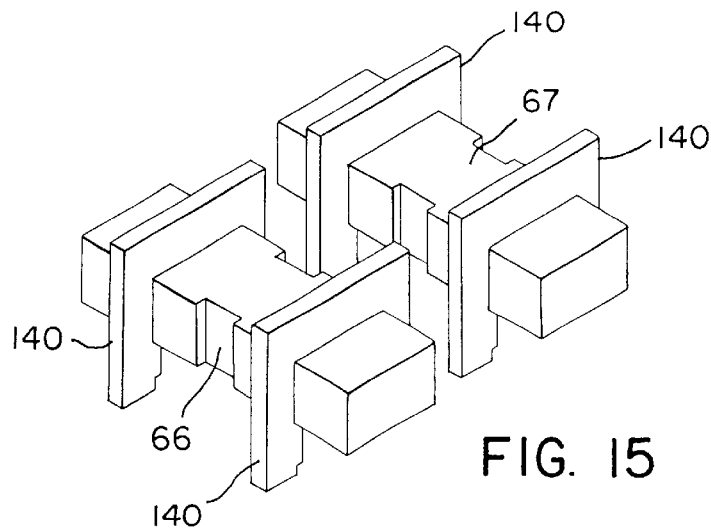
FIG. 15 is a perspective view of permanent magnets for the micromechanical actuator.
Figure 16:
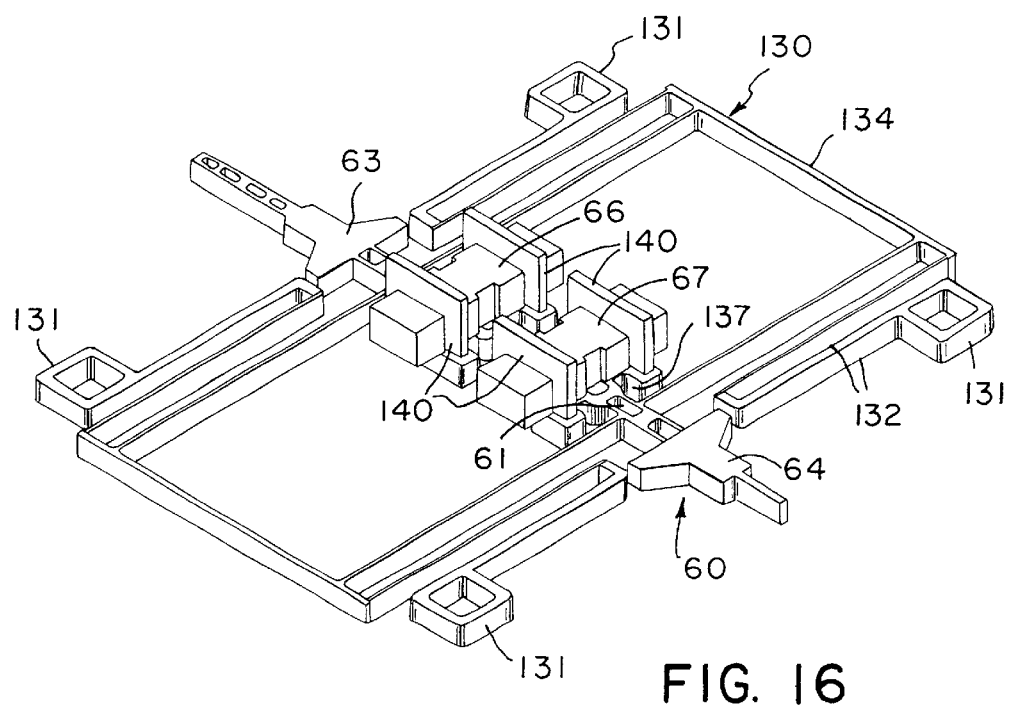
FIG. 16 is a perspective view of the spring and plunger assembly of FIG. 14 with the permanent magnets of FIG. 15 assembled thereto.
Figure 17:
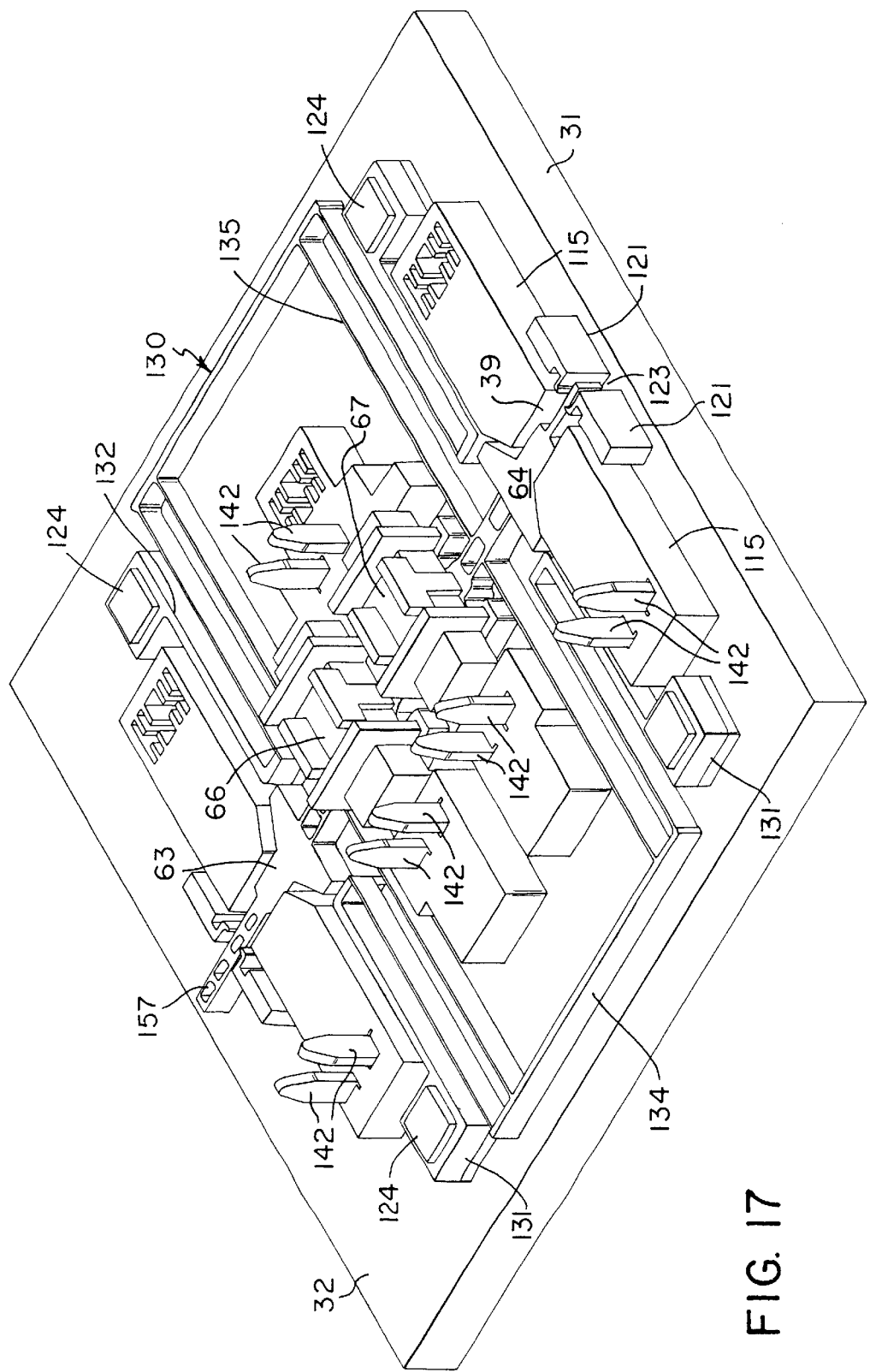
FIG. 17 is a view of an exemplary actuator with the plunger and spring assembly of FIG. 15 assembled onto the fixed parts shown in FIG. 13.
Figure 18:
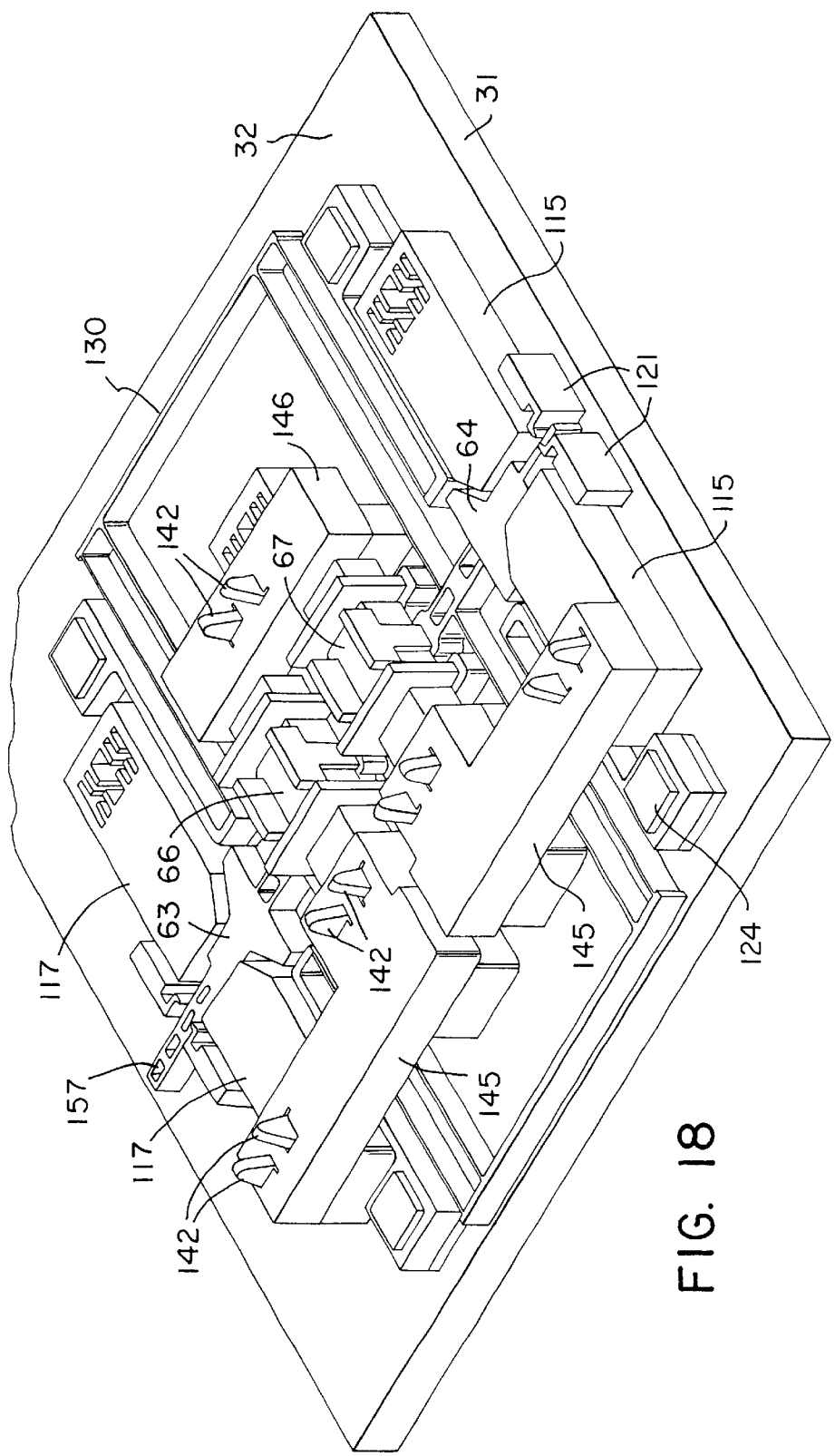
FIG. 18 is a view of the structures of FIG. 17 with the addition of core segments that bridge core sections that are fixed to the substrate.
Figure 19:
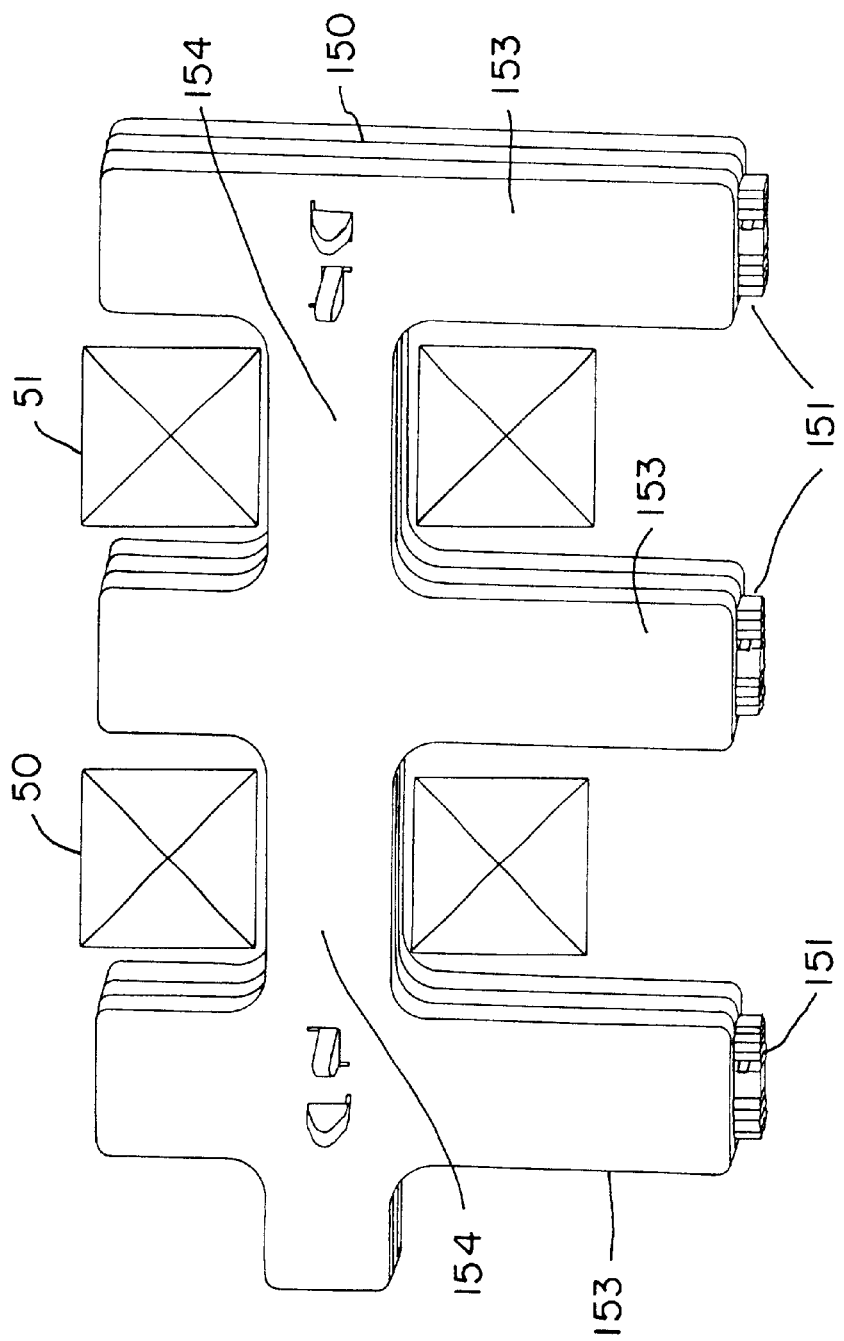
FIG. 19 is a perspective view of a coil mandrel for use with the micromechanical actuator of the invention.
Figure 20:
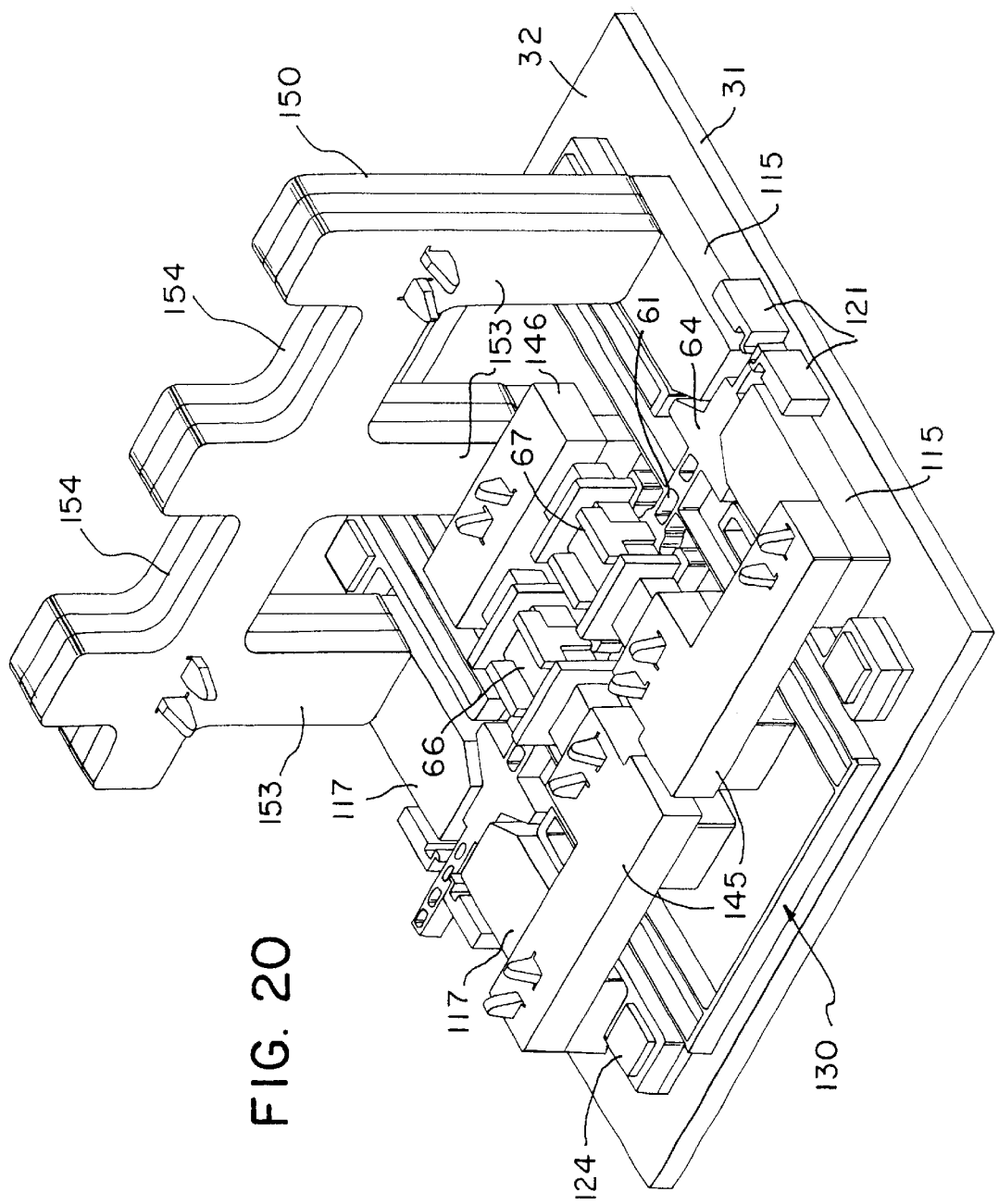
FIG. 20 is a perspective view of the completed micromechanical actuator with the mandrel of FIG. 19 assembled thereto.

A spring and plunger unit is shown in FIG. 14 and is formed as a free part by the sacrificial LIGA process. The mounting spring 130 is formed integrally with the plunger 60 and includes mounting sections 131 which are mounted to the substrate over the mounting posts 124, straight leaf sections 132 which extend from the mounting sections 131 inwardly and then outwardly to form folded leaf sections, outward end sections 134 to which the leaf sections are joined, and straight leaf sections 135 extending inwardly from the end sections to join to the plunger body 61. The mounting sections 131, straight leaf sections 132 and 135, end sections 134, plunger body 61 and plunger heads 63 and 64 are preferably formed integrally of a magnetic material such as permalloy. As used herein, magnetic material is a material, such as ferromagnetic materials, that have high permeability and can serve to guide magnetic flux. The plunger body 61 has magnet support sections 137 formed therein which have receptacle openings 138. As illustrated in FIG. 15, the permanent magnets 66 and 67 may be formed separately from the plunger body of a good permanent magnet material (e.g., NdFeB) by various processes as discussed above, with micro-electro-discharge machining being particularly well suited to forming the magnets. U-shaped magnet clamps 140 are shaped to fit over and engage into slots in the permanent magnets 66 and 67 and to fit into the receptacle opening slots 138 in the magnet supports 137 to hold the magnets 66 and 67 in place on the plunger body to form the completed spring and plunger assembly, as illustrated in FIG. 16. FIG. 17 illustrates the plunger and spring support assembly as mounted onto the substrate in position adjacent to the fixed core sections on the substrate. Several mounting pegs 142 are inserted into openings 143 in the fixed core sections (shown in FIG. 13) to allow assembly of free parts of the core section, as illustrated in FIG. 18, including core sections 145 which bridge the adjacent fixed core sections 117 and 118, and a core section 146 which is mounted on top of the core section 115. The core sections 145 and 146 are at an elevated position closely spaced from the permanent magnets 66 and 67, and at the same elevation above the substrate as the permanent magnets, to provide a low reluctance coupling between the permanent magnets and the core sections 145 and 146. The coils 50 and 51 are wound on a separate mandrel 150 shown in FIG. 19. The mandrel has pegs 151 extending downwardly from sections of the mandrel, on each side of the coils 50 and 51, which are formed to be inserted into the receptacle openings 116 on the fixed core sections. The completed actuator with the mandrel 150 assembled onto the fixed core sections is shown in FIG. 20 (with the coils 50 and 51 not shown for simplicity). The mandrel 150 includes upwardly extending leg sections 153 and bridging sections 154 (around which the coils 50 and 51 are wound), and form a low permeability flux path between the fixed core sections 115. Thus, it is seen that the complete high permeability flux paths illustrated in FIG. 2 are formed through the fixed core structures and the core structures that are assembled onto the fixed core structures.

As illustrated in FIG. 20, the plunger 60 includes a plunger extension section 157 which extends through the gap 122 in the stop structures 120, with the extension 157 including openings 158 therein which allow the plunger extension 157 to be coupled to other mechanical parts.

Figure 21:
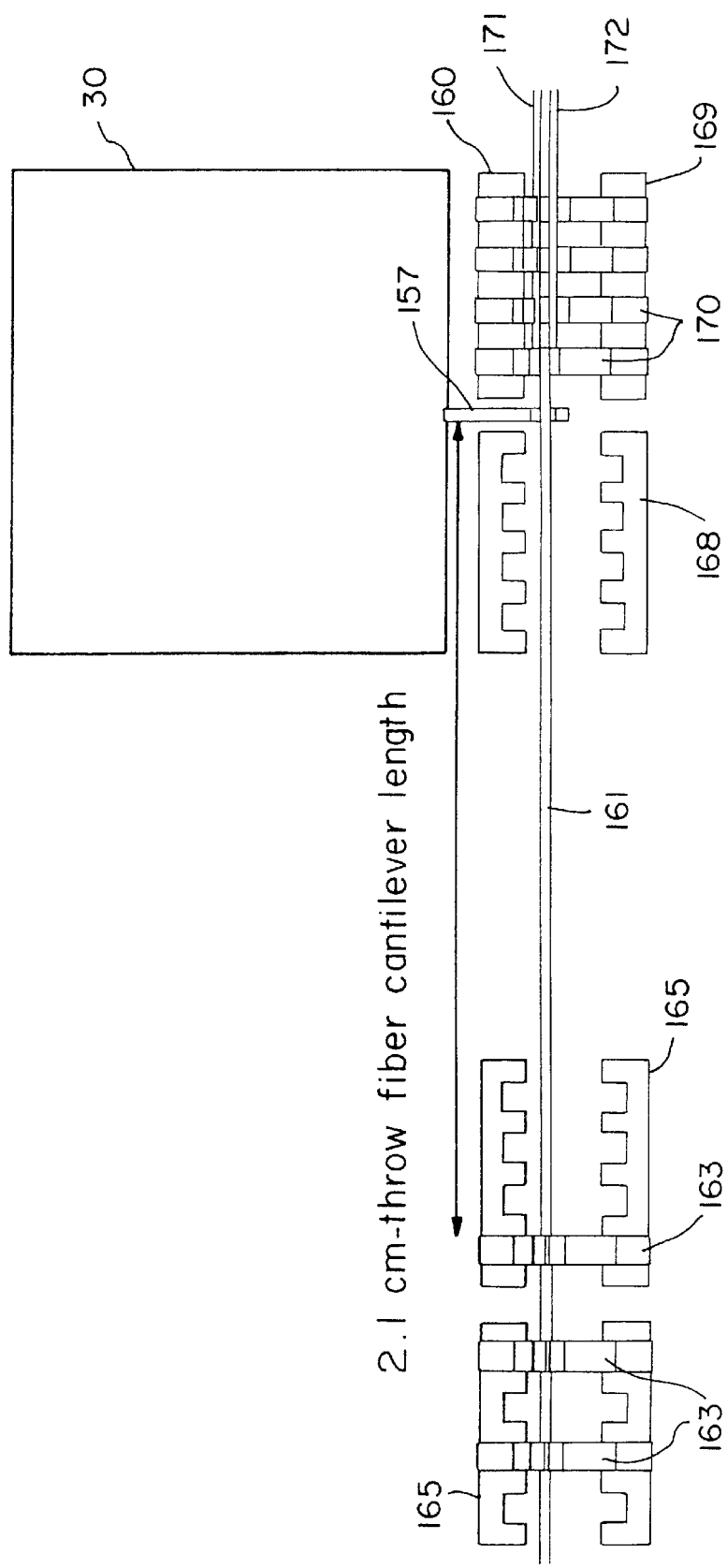
FIG. 21 is a simplified plan view of the actuator of the invention coupled to an optical fiber switch.
Figure 22:
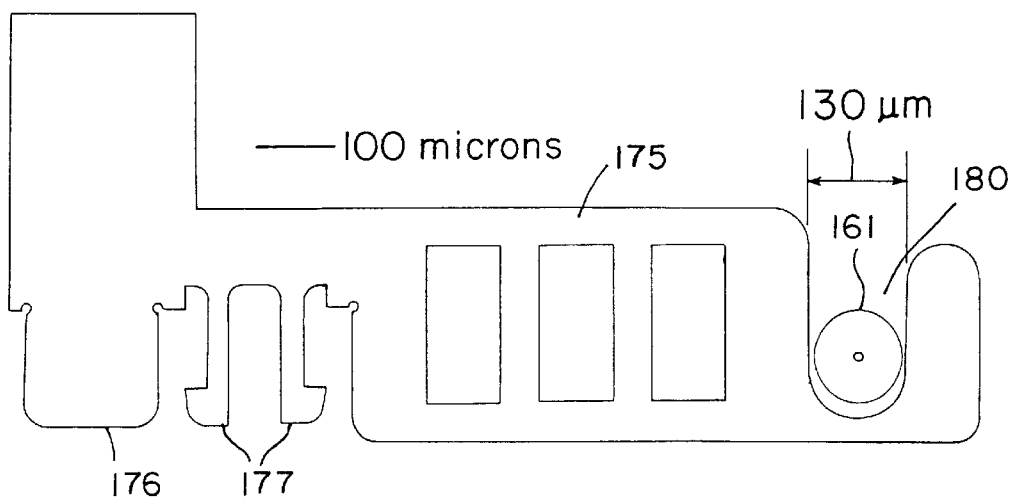
FIG. 22 is an elevation view of a movable optical fiber clip utilized with the optical fiber switch shown in FIG. 21.

An example of the manner of utilization of the actuator 30 for shifting a moving fiber with respect to two fixed optical fibers is shown in FIG. 21. The plunger extension 157 is connected to an optical fiber engagement element 160 which is engaged to a movable optical fiber 161. The fiber 161 is held in place by clips 163 which are engaged in slotted mounting structures 164 and 165 that are fixed to the substrate 31 and which may be formed by a LIGA process as discussed above. Slotted mounting structures 168 and 169 are also mounted adjacent to the actuator 30, with dual fiber clips 170 engaged in the slots of the mounting structure 169 to engage and hold two fixed output fibers 171 and 172. An engagement clip 175 for the movable fiber 161 is shown in FIG. 22 and has post sections 176 and 177 which are adapted to be engaged into the openings 158 in the plunger extension 157. The fiber mounting clip 175 includes a slot 180 into which the movable fiber 161 is seated. As the microactuator 30 is actuated to move the plunger between its two end positions, the moving fiber 161 is drawn to a position at which it aligns with one or the other of the fixed fibers 171 and 172.

Figure 23:
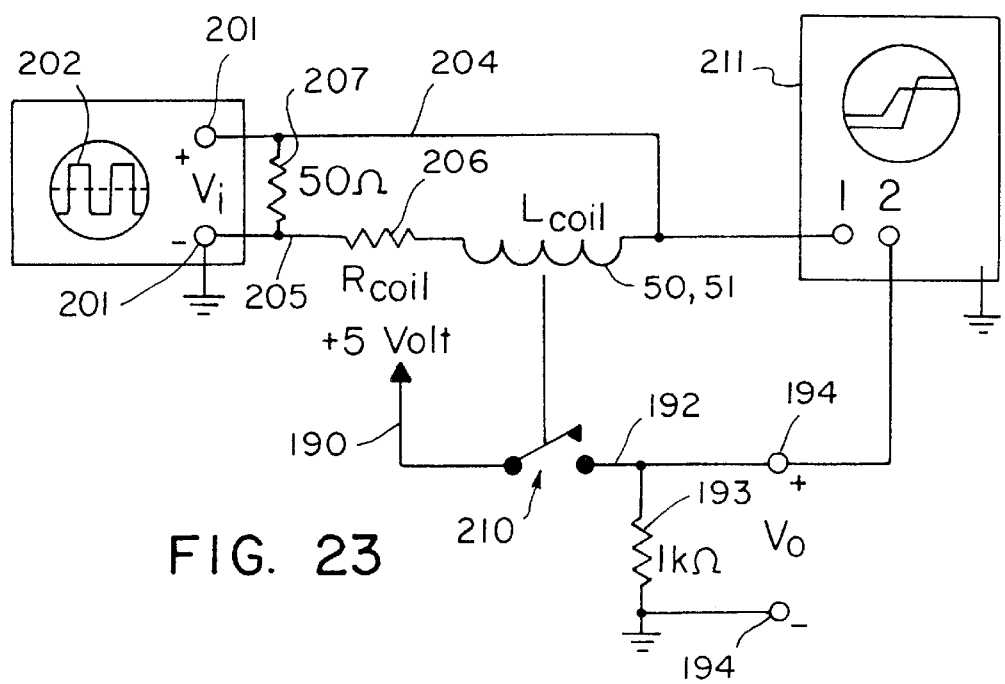
FIG. 23 is an illustrative electrical circuit for switching the micromechanical actuator of FIG. 20.

The actuator of FIG. 20 may be utilized as an electrical relay switch. One embodiment for implementation of the actuator as a switch is illustrated in FIG. 20, in which a DC voltage from a power supply is provided on a line 190 to electrical contact to a mounting post 124, to thereby make electrical contact with the spring and plunger assembly. One of the stop structures 121 has an electrical lead 191 connected thereto which is connected to ground through a resistor 193, such that an output voltage may be obtained across output terminals 194. When the plunger is switched so that the plunger head 64 makes contact with the stop structures 121, a connection is completed between the source of voltage on the line 190 and the output line 192, which causes voltage to be applied across the terminals 194. An exemplary electrical circuit which may be utilized to operate the actuator of FIG. 20 and to test the switching function of the actuator is shown in FIG. 23. The circuit of FIG. 23 includes a power supply 200 (which may be any switchable DC power supply) which provides selectable switching of the output voltage at its output terminals 201 between a positive voltage and a negative voltage, as illustrated by the waveform 202. A power supply line 204 is connected from one of the output terminals 201 to one end of the coils 50 and 51, and the other end of the coils 50, 51 is connected by a power line 205 back to the other terminal 201 of the power supply 200. As shown in FIG. 23, the coils 50, 51 have a coil inductance $L_{coil}$ and an internal coil resistance $R_{coil}$, represented by the resistor 206 shown in FIG. 23. A parallel resistor 207 may be connected across the output terminals 201 as shown. As illustrated in FIG. 23, the coils 50, 51 control a switch, schematically illustrated at 210, which is formed by the electrical contact between the plunger 64 and the stop structure 121. When the coil 50, 51 is supplied with electrical power in a direction to switch the actuator to drive the plunger 64 into contact with the stop structure 121, the switch 210 is closed, applying the voltage on the line 190 to the output line 192 and thus across the output terminals 194. For purposes of illustrating the invention, the output voltage $V_o$ from the switch may be measured by a measurement instrument such as the oscilloscope 211 illustrated in FIG. 23.

Exemplary devices were tested, utilizing the circuit of FIG. 23, which had oblique faces 90 and 91 at angles of 45° and 60° with respect to the linear direction of travel of the actuator. The actuator had a total size of roughly 6 mm×6 mm, with the coils 50 and 51 having 2,000 turns and an inductance L=24 mH. The permanent magnets were NdFeB rare earth permanent magnets. Devices having spring beam widths of 10 µm and 15 µm for the spring structures 132, 134 and 135 were utilized. The devices with 15 µm spring beam widths and a 60° oblique surfaces on the plunger heads were found to switch the fastest. Two operating regions as a function of drive current were indicated, a sub-threshold region and a normal operating region, with the dividing line being defined as the threshold current. Because of the energy stored in the springs, the actuator can switch from a latched state using less current than if the actuator switched from an unlatched state at the center position. The normal operating region is the current range over which the actuator wall would switch regardless of the starting position. The sub-threshold region is the current range over which the device will switch from a latched position. For an exemplary device, the minimum current for the normal current region was found to be 5.88 mA, and if the device was switched from a latched position, 3.37 mA. Switching occurs when the flux from the coil opposes the flux from the permanent magnet in the gap that is not favored and strengthens the flux in the gap that is favored. As the current in the coil is increased, the flux in the gap that is not favored first decreases to zero and then begins to increase again with a reverse polarity. This increased flux provides an undesired attractive force that can keep the plunger from switching. The shape of the plunger, and the possibility that the flux in the favored working gap can be saturated, can both serve to enhance this effect. The maximum drive current for the exemplary device was found to be 8.83 mA, providing an operating window of 5.8 mA to 8.83 mA. The minimum switching time was found to be 2.21 ms when operated at 7.4 mA, with most efficient operation at a switching current of 5.88 mA, at the threshold between the normal and sub-threshold regions, at which the minimum power dissipated was as low as 11 mW. The minimum energy required is as low as 25 µJ. Single mode optical fiber insertion losses were then determined using a 1550 nm light source with the actuator connected to switch optical fibers as shown in FIG. 21. Measured insertion losses were as low as 0.5 dB, and with matching fluid added, the insertion loss drops to between 0.1 and 0.2 dB.

It is understood that the invention is not confined to the particular embodiments set forth herein as illustrative, but embraces all such forms thereof as come within the scope of the following claims.

What is claimed is:

1. A bi-directional micromechanical latching actuator comprising:

(a) a non-magnetic substrate having a surface;

(b) a plunger having two magnetic heads spaced from each other and joined to move together, at least the heads of the plunger formed of a magnetic material;

(c) a magnetic core supported on the substrate having first end faces spaced apart to define a first gap in the core adjacent to a first of the heads of the plunger and second end faces spaced apart to define a second gap in the core adjacent to a second of the heads of the plunger;

(d) means for supporting the plunger for linear movement in two directions such that the heads of the plunger can move toward and away from the first and second gaps in the core, wherein motion in one direction brings the first of the heads closer to the first of the gaps in the core and the second of the heads further from the second of the gaps in the core, and wherein motion in the other direction brings the second head closer to the second gap in the core and the first head further away from the first gap in the core;

(e) at least one permanent magnet mounted to the plunger to move therewith and forming with the core a first magnetic circuit in which flux from the permanent magnet passes through the magnetic core across the first of the gaps through the first head of the plunger and thence back through the magnetic core to the permanent magnet and a second magnetic circuit in which the flux from the permanent magnet passes through the magnetic core across the second of the gaps in the core through the second of the heads and thence back through the magnetic core to the permanent magnet; and (f) at least one coil of electrical conductor coupled to the magnetic core to provide magnetic flux therethrough to the first magnetic circuit such that when the coil is supplied with electrical current in a first direction the coil provides flux in a direction through the first magnetic circuit which augments the flux from the at least one permanent magnet such that the first head of the plunger is magnetically drawn toward the first gap by reluctance action and provides flux to the second magnetic circuit in a direction to oppose the flux in the second magnetic circuit from the at least one permanent magnet, and wherein when the direction of current through the coil is reversed, the coil provides flux to the first magnetic circuit in a direction to oppose the flux from the at least one permanent magnet and provides flux to the second magnetic circuit which augments the flux from the at least one permanent magnet such that the second head of the plunger is magnetically drawn toward the second gap by reluctance action.

2. The actuator of claim 1 further including stop structures positioned to engage a portion of the plunger at a selected limit of travel of the plunger in each direction of linear movement of the plunger such that the plunger is held at one or the other of its limits of travel by reluctance action from the flux from the permanent magnet when no current is supplied to the first and second coils.

3. The actuator of claim 1 wherein the means for supporting the plunger comprises a spring mounted to the substrate to suspend the plunger for linear movement above the substrate surface.

4. The actuator of claim 3 wherein the spring is integrally formed with the plunger and includes mounting sections mounted to the substrate, straight leaf sections extending from the mounting sections, outward end sections to which the leaf sections are joined, and leaf sections extending inwardly from the end sections to join to a plunger body on which the plunger heads are formed, the mounting sections, straight leaf sections, end sections, plunger body, and plunger heads formed integrally of ferromagnetic material.

5. The actuator of claim 1 wherein there are two separate permanent magnets mounted on the plunger, a first of the permanent magnets mounted in position to provide flux to the first magnetic circuit and the second of the permanent magnets mounted to provide flux to the second of the magnetic circuits.

6. The actuator of claim 5 further including a gap in the magnetic core to separate the magnetic core into two sections, a first section guiding the flux for the first magnetic circuit and a second section guiding the flux for the second magnetic circuit.

7. The actuator of claim 1 further including a gap in the magnetic core to separate the magnetic core into two sections, a first section guiding the flux for the first magnetic circuit and a second section guiding the flux for the second magnetic circuit.

8. The actuator of claim 1 further including an electrical power supply connected to the coil to provide drive power therethrough with switchable directions of current provided to the coil.

9. The actuator of claim 1 wherein the coil comprises first and second coils are electrically connected together in series.

10. The actuator of claim 1 wherein the core is formed in sections on the substrate, the top surface of each core section being substantially planar and wherein the core has openings in its top surface defining receptacles in each core section, wherein the coils are wound on a mandrel that has pegs extending from sections on each side of the coils, the pegs adapted to fit into the receptacle openings in the core, the mandrel and coils mounted to the core by insertion of the pegs on the mandrel into the receptacle openings in the core sections to complete the first and second magnetic flux circuits through the mandrel, the core sections, the gaps between the core sections, and the at least one permanent magnet.

11. The actuator of claim 1 wherein the plunger comprises an elongated plunger body, the two heads formed at spaced positions on the plunger body, the at least one permanent magnet mounted to the elongated plunger body for motion therewith.

12. The actuator of claim 11 wherein the first and second heads each have surfaces that are oblique to the linear direction of travel of the plunger, and wherein the end faces of the core defining the first and second gaps have surfaces oblique to the direction of travel of the plunger that face and align with the oblique surfaces on the first and second heads, respectively, to form flux paths across the facing surfaces on the core and the heads.

13. The actuator of claim 12 including stop structures on the substrate positioned to limit the travel of the plunger in each direction such that at each limit of travel the oblique surfaces on one of the first and second heads and the facing oblique surfaces on the end faces of the gaps in the core are closely adjacent but not in contact.

14. The actuator of claim 13 including an optical switch coupled to the plunger to shift the direction of transmission of light through the switch when the plunger is moved from one of its limits of travel to the other.

15. The actuator of claim 14 wherein the optical switch includes an optical fiber connected to the plunger to be moved by it and two fixed optical fibers, the moving and fixed optical fibers having end faces such that the end face of the moving fiber is aligned with the end face of one or the other fixed fiber at each of the limits of travel.

16. The actuator of claim 1 wherein the at least one permanent magnet is an NdFeB permanent magnet.

17. A bi-directional micromechanical latching actuator comprising:

(a) a non-magnetic substrate having a surface;
(b) a plunger having an elongated plunger body and two magnetic heads spaced from each other and joined to the plunger body to move together, at least the heads of the plunger formed of a magnetic material;
(c) a magnetic core supported on the substrate having first end faces spaced apart to define a first gap in the core adjacent to a first of the heads of the plunger and second end faces spaced apart to define a second gap in the core adjacent to a second of the heads of the plunger;
(d) a spring mounted to the substrate and to the plunger to suspend the plunger for linear movement in two directions such that the heads of the plunger can move toward and away from the first and second gaps in the core, wherein motion in one direction brings a first of the heads closer to the first of the gaps in the core and the second of the heads further from the second of the gaps in the core, and wherein motion in the other direction brings the second head closer to the second gap in the core and the first head further away from the first gap in the core;

(e) two permanent magnets mounted to the plunger body to move therewith, a first of the permanent magnets forming with the core a first magnetic circuit in which flux from the first permanent magnet passes through the magnetic core across the first of the gaps through the first head of the plunger and thence back through the magnetic core to the first permanent magnet, and a second of the permanent magnets forming with the core a second magnetic circuit in which the flux from the second permanent magnet passes through the magnetic core across the second of the gaps in the core through the second of the heads and thence back through the magnetic core to the second permanent magnet;

(f) at least one coil of electrical conductor coupled to the magnetic core to provide magnetic flux therethrough to the first magnetic circuit, such that when the coil is supplied with electrical current in a first direction the coil provides flux in a direction through the first magnetic circuit which augments the flux from the first permanent magnet such that the first head of the plunger is magnetically drawn toward the first gap by reluctance action and provides flux to the second magnetic circuit in a direction to oppose the flux in the second magnet circuit from the second permanent magnet, and wherein when the direction of current through the coil is reversed, the coil provides flux to the first magnetic circuit in a direction to oppose the flux in the first magnetic circuit from the first permanent magnet and provides flux to the second magnetic circuit which augments the flux from the second permanent magnet such that the second head of the plunger is magnetically drawn toward the second gap by reluctance action; and (g) stop structures positioned to engage a portion of the plunger at a selected limit of travel of the plunger in each direction of linear movement of the plunger such that the plunger is held at one or the other of its limits of travel by reluctance action from the flux from the first or the second permanent magnets when no current is supplied to the first and second coils.

18. The actuator of claim 17 wherein the spring is, integrally formed with the plunger and includes mounting sections mounted to the substrate, straight leaf sections extending from the mounting sections, outward end sections to which the leaf sections are joined, and leaf sections extending inwardly from the end sections to join to a plunger body on which the plunger heads are formed, the mounting sections, straight leaf sections, end sections, plunger body, and plunger heads formed integrally of ferromagnetic material.

19. The actuator of claim 17 further including a gap in the magnetic core to separate the magnetic core into two sections, a first section guiding the flux for the first magnetic circuit and a second section guiding the flux for the second magnetic circuit.

20. The actuator of claim 17 further including a gap in the magnetic core to separate the magnetic core into two sections, a first section guiding the flux for the first magnetic circuit and a second section guiding the flux for the second magnetic circuit.

21. The actuator of claim 17 wherein the first and second coils are electrically connected together in series.

22. The actuator of claim 21 further including an electrical power supply connected to the first and second coils to provide drive power therethrough with switchable directions of current provided to the coils.

23. The actuator of claim 17 wherein the core is formed in sections on the substrate, the top surface of each core section being substantially planar and wherein the core has openings in its top surface defining receptacles in each core section, wherein the coils are wound on a mandrel that has pegs extending from sections on each side of the coils, the pegs adapted to fit into the receptacle openings in the core, the mandrel and coils mounted to the core by insertion of the pegs on the mandrel into the receptacle openings in the core sections to complete the first and second magnetic flux circuits through the mandrel, the core sections, the gaps between the core sections, and the first and second permanent magnets.

24. The actuator of claim 17 wherein the first and second heads each have surfaces that are oblique to the linear direction of travel of the plunger, and wherein the end faces of the core defining the first and second gaps have surfaces oblique to the direction of travel of the plunger that face and align with the oblique surfaces on the first and second heads, respectively, to form flux paths across the facing surfaces on the core and the heads.

25. The actuator of claim 24 wherein the stop structures on the substrate limit the travel of the plunger in each direction such that at each limit of travel the oblique surfaces on one of the first and second heads and the facing oblique surfaces on the end faces of the gaps in the core are closely adjacent but not in contact.

26. The actuator of claim 17 including an optical switch coupled to the plunger to shift the direction of transmission of light through the switch when the plunger is moved from one of its limits of travel to the other.

27. The actuator of claim 26 wherein the optical switch includes an optical fiber connected to the plunger to be moved by it and two fixed optical fibers, the moving and fixed optical fibers having end faces such that the end face of the moving fiber is aligned with the end face of one or the other fixed fiber at each of the limits of travel.

28. The actuator of claim 1 wherein the first and second permanent magnets are NdFeB permanent magnets.

* * * * *

UNITED STATES PATENT AND TRADEMARK OFFICE
CERTIFICATE OF CORRECTION

PATENT NO. : 6,607,305 B2
DATED : August 18, 2003
INVENTOR(S) : Kevin K. Fischer, Henry Guckel (deceased) and Yogesh B. Gianchandani It is certified that error appears in the above-identified patent and that said Letters Patent is hereby corrected as shown below:

Column 1,
Line 4, after the title and before "FIELD OF THE INVENTION", please insert:

-- STATEMENT OF GOVERNMENT RIGHTS

This invention was made with United States government support awarded by the following agency: NSF 9985422. The United States has certain rights in this invention. --

Column 6,
Line 14, delete "firs gap" and replace it with -- first gap --.
Line 59, delete the words "reaches it end position" and replace them with -- reaches its end position --.

Column 15,
Line 51, please delete the comma after the word "is," to read -- wherein the spring is integrally --.

Signed and Sealed this

Twenty-third Day of December, 2003

JAMES E. ROGAN
*Director of the United States Patent and Trademark Office*